(12) United States Patent
Jia

(10) Patent No.: US 9,683,169 B2
(45) Date of Patent: Jun. 20, 2017

(54) SMOOTHING PHOSPHORS FOR AC LED LIGHTING

(71) Applicant: Performance Indicator, LLC, Lowell, MA (US)

(72) Inventor: Weiyi Jia, Chelmsford, MA (US)

(73) Assignee: PERFORMANCE INDICATOR, LLC, Lowell, MA (US)

( * ) Notice: Subject to any disclaimer, the term of this patent is extended or adjusted under 35 U.S.C. 154(b) by 580 days.

(21) Appl. No.: 14/051,488

(22) Filed: Oct. 11, 2013

(65) Prior Publication Data

US 2015/0102262 A1 Apr. 16, 2015

(51) Int. Cl.
*C09K 11/80* (2006.01)
*C09K 11/64* (2006.01)
(Continued)

(52) U.S. Cl.
CPC ........ *C09K 11/7792* (2013.01); *C09K 11/592* (2013.01); *C09K 11/7706* (2013.01);
(Continued)

(58) Field of Classification Search
CPC . C09K 11/7792; C09K 11/7706; C09K 11/64; C09K 11/61; C09K 11/59; C09K 11/57
See application file for complete search history.

(56) References Cited

U.S. PATENT DOCUMENTS 4,003,845 A 1/1977 van den Boom et al.
6,960,309 B2 * 11/2005 Aoki ................ C09K 11/7734
252/301.4 F
(Continued)

FOREIGN PATENT DOCUMENTS

KR 20020051845 6/2012

OTHER PUBLICATIONS

International Search Report; International Application No. PCT/US2014/056872; International Filing Date Sep. 23, 2014; Date of Mailing: Jan. 28, 2015; 5 pages.
(Continued)

*Primary Examiner* — Carol M Koslow
(74) *Attorney, Agent, or Firm* — Morgan, Lewis & Bockius LLP

(57) ABSTRACT

Disclosed are smoothing phosphors for AC LED lighting that are capable of prolonging the light emission time of an AC LED (or array of AC LEDs) during a ½ cycle response to a, phase change of the alternating current to substantially reduce flicker. The smoothing phoshor of the present teachings comprises a matrix represented by the formula: $(1-k-r-v)M\cdot(m-p)X\cdot(n-0.5x-0.5y)Al_2O_3:(x+p)MnO$, $ySiO_2$, $kEu$, $rR$, $vLi$, wherein M is at least one of $La_2O_3$, $Ce_2O_3$, $Gd_2O_3$, $Lu_2O_3$, $Ba_2OF_2$, $Sr_2OF_2$, $Ca_2OF_2$, $Ba_2OCl_2$, $Sr_2OCl_2$, $Ca_2OCl$, BaO, SrO, CaO, or ZnO; provided that when M comprises BaO, SrO, CaO, or ZnO, M does not comprise $La_2O_3$, $Ce_2O_3$, $Gd_2O_3$, $Lu_2O_3$, $Ba_2OF_2$, $Sr_2OF_2$, $Ca_2OF_2$, $Ba_2OCl_2$, $Sr_2OCl_2$, or $Ca_2OCl_2$; X is at least one of MgO or ZnO; R is at least one of Sm, Pr, Tb, Dy, Er, or Ho; m=0 to 2; n=4 to 11; x=0.005 to 1; y=0.005 to 1; p=0 to 1; k=0 to 0.2; r=0 to 0.2; and v=0 to 0.2.

3 Claims, 15 Drawing Sheets

(51) Int. Cl.
*C09K 11/77* (2006.01)
*C09K 11/59* (2006.01)

(52) U.S. Cl.
CPC ...... *C09K 11/7721* (2013.01); *C09K 11/7734* (2013.01); *C09K 11/7774* (2013.01)

(56) References Cited

U.S. PATENT DOCUMENTS

| | | | |
|---|---|---|---|
| 7,014,792 B2* | 3/2006 | Raukas | C09K 11/7734 252/301.4 F |
| 8,119,027 B2* | 2/2012 | Onimaru | C09K 11/595 252/301.4 F |
| 8,129,685 B2 | 3/2012 | Nakamura et al. | |
| 8,329,061 B2 | 12/2012 | Jia | |
| 2002/0053874 A1* | 5/2002 | Shiiki | C09K 11/643 313/582 |
| 2002/0080501 A1 | 6/2002 | Kawae et al. | |
| 2012/0013243 A1 | 1/2012 | Liu et al. | |
| 2012/0229038 A1 | 9/2012 | Zeng et al. | |
| 2012/0256126 A1 | 10/2012 | Jia | |
| 2013/0187556 A1 | 7/2013 | Zeng et al. | |

OTHER PUBLICATIONS

Written Opinion of the International Searching Authority; International Application No. PCT/US2014/056872; International Filing Date: Sep. 23, 2014; Date of Mailing Jan. 28, 2015; 3 pages.

Masaaki Tamatani, "Fluorescence in β-Al2O3-Like Materials of K, Ba and La Activated with Eu2+ and Mn2+", Japanese Journal of Applied Physics, 1974, 950-56, vol. 13.

I. F. Chang et al., "Efficiency enhancement in manganese-doped zinc silicate phosphor with AlPO4 substitution", Applied Physics Letters, 1979, 229-31, vol. 35.

Clifford C. Klick et al., "On the Luminescence of Divalent Manganese in Solids", Journal of the Optical Society of America, 1952, 910-16, vol. 42.

Jun Zhou, Yuhua Wang, Bitao Liu, and Feng Li; Energy transfer between Eu-Mn and photoluminescence properties of Ba0.75Al11O17.25-BaMgAl10O17: Eu2+, Mn2+ solid solution; Journal of Applied Physics, 108, 033106 (2010).

Jun Zhou, Yuhua Wang, Bitao Liu, and Yanghua Lu; Effect of H3BO3 on structure and photoluminescence of BaAl12O19:Mn2+ phosphor under VUV excitation; Journal of Alloys and Compounds, 484, (2009) 439-443.

* cited by examiner

SMOOTHING PHOSPHORS FOR AC LED LIGHTING

BACKGROUND OF INVENTION

These teachings relate generally to smoothing phosphors for AC LED lighting, and more particularly to smoothing phosphors being aluminate-based phosphors co-doped with at least manganese, $Mn^{2+}$, and silicon, $Si^{4+}$, that substantially reduce flicker of an AC LED (or array of AC LEDs) by way of prolonging the light emission time of an AC LED (or array of AC LEDs) during a ½ cycle response to a phase change of the alternating current.

As diodes, LEDs are direct current components and thus, when subjected to a sinusoidally alternating current (AC), such as provided by typical AC mains, LEDs will only produce light emission during half of the cycle resulting in significant loss of electrical efficiency. In order to take advantage of the full cycle, and therefore increasing electrical efficiency, numerous methods have been employed. For example, LED circuits are designed as rectifiers that invert the phase of the negative half of the cycle, making the full cycle of AC available for use with the LED. Alternatively, circuits are constructed with multiple LEDs such that the full cycle can be used for illumination. In light of these numerous methods employed, such AC-LED chips (or simply "AC-LEDs") are becoming more attractive for use in low-cost general illumination. However, the light produced by AC-LEDs exhibit an unacceptably high degree of flicker, caused by the rapid alteration in polarity at mains frequency that requires the current to become zero at the points of inflection of the cycle. Since this frequency is typically around 50-60 Hz, this flicker can be irritating, particularly in the case of indoor lighting applications. Shifting the phase of one or more AC LEDs in an array is one possible method in reducing the flicker, but these electronic modifications introduce reactive power consumption, reducing the component's power factor and increasing harmonic distortion in the circuit. Thus, there is a need for alternative methods in addressing the existence of flicker with AC LEDs.

Currently, photoluminescent materials are used in the construction of LEDs to modify the emission by way of energy conversion, so as to provide longer wavelengths then are naturally emitted by the semiconductor chip. For example, cerium doped yttrium aluminum garnet phosphors are used to produce cool white LEDs. Characteristics of color quality, such as correlated color temperature and color rendering index, can be controlled by varying the amount and type of phosphor used for the energy conversion. Unfortunately, most phosphors currently employed with LEDs have an emission decay that is much faster, by several orders of magnitude, than the frequency of the flicker, and therefore are not useful in the reduction of flicker that results in AC LEDs.

There is, therefore, a need for phosphors which are capable of providing a longer emission decay thereby extending the light emission time of an AC LED (or array of AC LEDs) during a ½ cycle response to a phase change of the AC. It is further desirable to provide such phosphors that not only modify the emission of an AC LED (or array of AC LEDs), but also substantially reduce the flicker produced.

SUMMARY OF INVENTION

The present teachings provide for smoothing phosphors for AC LED lighting that are capable of prolonging the light emission time of an AC LED (or array of AC LEDs) during a ½ cycle response to a phase change of the AC, thereby substantially reducing flicker. The smoothing phosphor of the present teachings comprises a matrix represented by the formula: $(1-k-r-v)M \cdot (m-p)X \cdot (n-0.5x-0.5y)Al_2O_3:(x+p)MnO, ySiO_2, kEu, rR, vLi$, wherein M is at least one of $La_2O_3$, $Ce_2O_3$, $Gd_2O_3$, $Lu_2O_3$, $Ba_2OF_2$, $Sr_2OF_2$, $Ca_2OF_2$, $Ba_2OCl_2$, $Sr_2OCl_2$, $Ca_2OCl_2$, BaO, SrO, CaO, or ZnO; provided that when M comprises BaO, SrO, CaO, or ZnO, M does not comprise $La_2O_3$, $Ce_2O_3$, $Gd_2O_3$, $Lu_2O_3$, $Ba_2OF_2$, $Sr_2OF_2$, $Ca_2OF_2$, $Ba_2OCl_2$, $Sr_2OCl_2$, or $Ca_2OCl_2$; X is at least one of MgO or ZnO; R is at least one of Sm, Pr, Tb, Dy, Er, or Ho; m=0 to 2; n=4 to 11; x=0.005 to 1; y=0.005 to 1; p=0 to 1; k=0 to 0.2; r=0 to 0.2; and v=0 to 0.2. In some embodiments, M is at least one of $La_2O_3$, $Ce_2O_3$, $Gd_2O_3$, $Lu_2O_3$, $Ba_2OF_2$, $Sr_2OF_2$, $Ca_2OF_2$, $Ba_2OCl_2$, $Sr_2OCl_2$, or $Ca_2OCl_2$, m=0, n=11, and p=0, and the matrix is represented by the formula: $(1-k-r-v)M \cdot (11-0.5x-0.5y)Al_2O_3:xMnO, ySiO_2, kEu, rR, vLi$. In some embodiments, M is at least one of BaO, SrO, CaO, or ZnO, m=2, n=8, and the matrix is represented by the formula: $(1-k-r-v)M \cdot (2-p)X \cdot (8-0.5x-0.5y)Al_2O_3:(x+p)MnO, ySiO_2, kEu, rR, vLi$. In some embodiments, M is at least one of BaO, SrO, CaO, or ZnO, m=1, n=5, and the matrix is represented by the formula: $(1-k-r-v)M \cdot (1-p)X \cdot (5-0.5x-0.5y)Al_2O_3:(x+p)MnO, ySiO_2kEu, rR, vLi$. In some embodiments, M is at least one of BaO, SrO, CaO, or ZnO, m=1, n=7, and the matrix is represented by the formula: $(1-k-r-v)M \cdot (1-p)X \cdot (7-0.5x-0.5y)Al_2O_3:(x+p)MnO, ySiO_2, kEu, rR, vLi$. In some embodiments, M is at least of BaO, SrO, CaO, or ZnO, m=0, n=6, p=0, and the matrix is represented by the formula: $(1-k-r-v)M \cdot (6-0.5x-0.5y)Al_2O_3:xMnO, ySiO_2, kEu, rR, vLi$.

BRIEF DESCRIPTION OF THE DRAWINGS

The present teachings are illustratively shown and described in reference to the accompany drawings, in which.

DETAILED DESCRIPTION OF THE INVENTION

Figure 1:
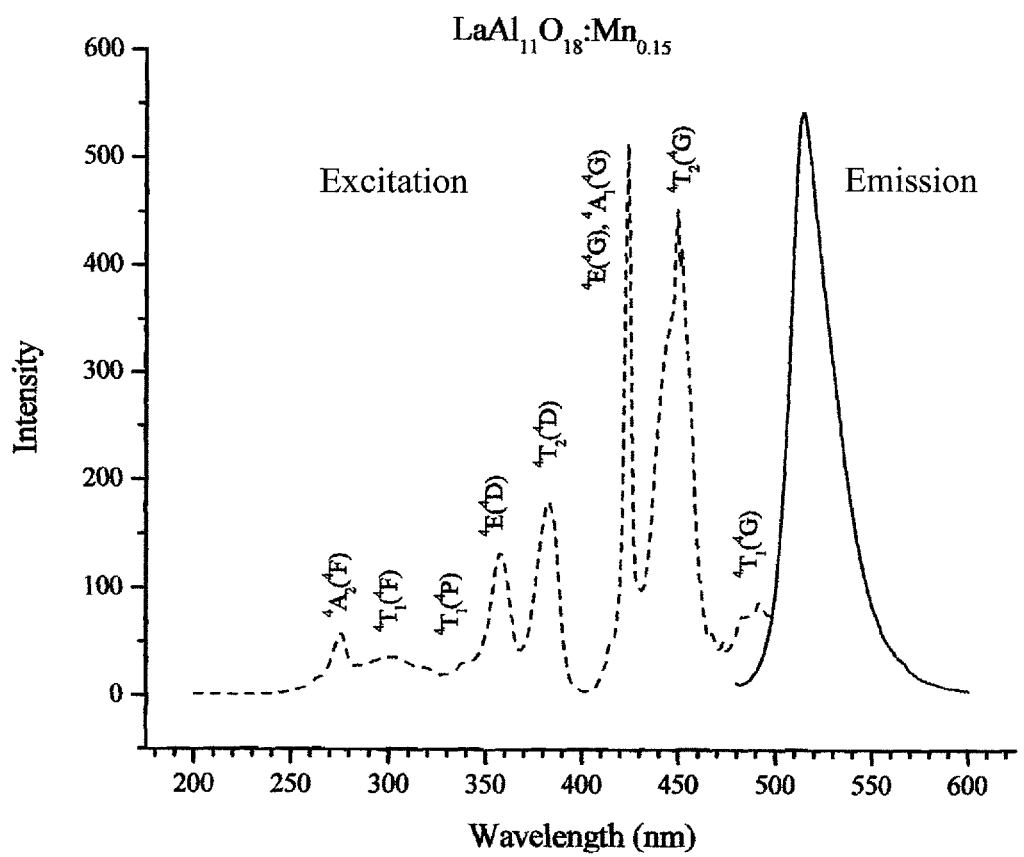
FIG. 1 shows the emission and excitation spectra of $LaAl_{11}O_{18}:Mn_{0.15}$, showing that $La^{3+}$ aluminate compounds are suitable hosts for $Mn^{2+}$ for use as smoothing phosphors in blue AC LED lighting applications.

The present teachings are directed to the creation of smoothing phosphors for AC LED lighting that are capable of reducing flicker of an AC LED (or array of LEDs). The smoothing phosphor of the present teachings comprises a matrix represented by the general formula: $(1-k-r-v)M \cdot (m-p)X \cdot (n-0.5x-0.5)Al_2O_3:(x+p)MnO, ySiO_2, kEu, rR, vLi$, wherein M is at least one of $La_2O_3$, $Ce_2O_3$, $Gd_2O_3$, $Lu_2O_3$, $Ba_2OF_2$, $Sr_2OF_2$, $Ca_2OF_2$, $Ba_2OCl_2$, $Sr_2OCl_2$, $Ca_2OCl_2$, BaO, SrO, CaO, or ZnO; provided that when M comprises BaO, SrO, CaO, or ZnO, M does not comprise $La_2O_3$, $Ce_2O_3$, $Gd_2O_3$, $Lu_2O_3$, $Ba_2OF_2$, $Sr_2OF_2$, $Ca_2OF_2$, $Ba_2OCl_2$, $Sr_2OCl_2$, or $Ca_2OCl_2$; X is at least one of MgO or ZnO; R is at least one of Sm, Pr, Tb, Dy, Er, or Ho; m=0 to 2; n=4 to 11; x=0.005 to 1; y=0.005 to 1; p=0 to 1; k=0 to 0.2; r=0 to 0.2; and v=0 to 0.2.

When an LED (or array of LEDs) are directly pumped or operated from AC, typically 110V/60 Hz or 230V/50 Hz, the instantaneous AC voltage applied has to exceed a minimum threshold value in order for current to flow through the LED (or array of LEDs), making the LED turn on and emit light. Given the AC LED (or array of AC LEDs) minimum threshold value, along with the sinusoidal waveform of AC, the AC LED turns on and off at the same frequency, causing the AC LED (or array of AC LEDs) to flicker when directly connected to an AC power source, thereby affecting the observed quality of light produced.

Flicker is the periodic change in the instantaneous light output of a light source. Flicker is measured using two different metrics, i.e. percent flicker and flicker index. Percent flicker, sometimes referred to as "modulation index", is defined as the ratio of the maximum light intensity output value minus the minimum light intensity output value divided by the sum of the maximum and minimum light intensity output values for one AC cycle. Flicker index is defined as the ratio of the area under the light intensity output curve above the average light intensity output value to the total area of the light intensity output curve for one AC cycle. Although both metrics for flicker measurement are relative measures of the cyclic variation in light output of a light source, percent flicker does not take into account the waveform of the light source, nor the duty cycle, whereas flicker index does. Nonetheless, the presence of flicker can substantially impact the quality of light produced and thus perceived by a human observer.

By employing smoothing phosphors in accordance with the present invention, the light emission time of the AC LED (or array of LEDs) is prolonged during a ½ cycle response to a phase change of the AC such that flicker can be reduced. Generally speaking, an AC LED operating at 50 to 120 Hz has an off period that is normally about 1 ms to about 10 ms. When a smoothing phosphor is used, the AC LED continues to emit light during this off period such that the flicker, otherwise produced, is substantially minimized. In order for a smoothing phosphor to be effective in the reduction of flicker of an AC LED, the smoothing phosphor should have an emission lifetime that is substantially similar to the off period of the AC LED. Ions having such an emission lifetime include $Mn^{2+}$, $Fe^{3+}$, 4f rare earth ions, or ions with s electrons in the out-shell, such as $Bi^{3+}$ $(6s^2)$, $Tl^{30}$ $(6s^2)$, $Sb^{3+}$ $(5s^2)$, $Sn^{2+}$ $(5s^2)$, all of which involve spin-forbidden transitions, and thus provide a longer lifetime of emission. However, based on the emission spectrum of an AC LED, along with additional requirements for practical applications of AC LED lighting, $Fe^{3+}$, 4f rare earth ions, or ions with s electrons in the out-shell are not suitable.

In general, $Mn^{2+}$ ions emit light that is characteristically in the green or red region of the electromagnetic spectrum. $Mn^{2+}$ has 5 electrons in its 3d shell, labeled as $3d^5$. The ground state of $Mn^{2+}$ is S-state with zero total orbital angular momentum, total spin 5/2, and the spin multiplet, indicated as a superscript, of 6, thus labeled as $^6S_0$. The first excited state of free $Mn^{2+}$ ions is $^4G$. Above $^4G$, are $^4P$, $^4D$, $^2I$, $^4F$, $^2D$, etc. In the cubic crystal field, $^6S_0$ is represented as $^6A_1$. The excited state $^4G$, having 9-fold orbital degeneracy, is split into $^4T_1$, $^4T_2$, $^4E$, and $^4A_1$ in the cubic representation. A is an orbital singlet, E is a doublet, and Ts are triplets. It can be noticed that all spin-multiplets (S=4 or 2) of excited states are different from the ground state (S=6). Therefore, all the electronic transitions of $Mn^{2+}$ are spin forbidden and thus illustrate an emission lifetime of $Mn^{2+}$ that is substantially similar to the off period of an AC LED (or array of AC LEDs).

Furthermore, this also implies that the electronic transition probability of $Mn^{2+}$ is relatively low, and thus the excitation of $Mn^{2+}$ with that of AC LED emission is weaker than that of a spin allowed transition. To aid in the excitation of $Mn^{2+}$ with that of AC LED emission, a host matrix with strong absorption of AC LED emission through $Mn^{2+}$ was investigated. In addition, the host matrix should also entail a strong, broad, efficient emission in the spectral emission range of $Mn^{2+}$, an emission lifetime that is also substantially similar to the off period of the AC LED, and have a high concentration quenching onset level of the emissive $Mn^{2+}$ ions. In light of the foregoing characteristics, it was determined that suitable host matrices for $Mn^{2+}$ is that of aluminate-based compounds having the general formula: $(1-k-r-v) M \cdot (m-p)X \cdot (n-0.5x-0.5y)Al_2O_3$, wherein M is at least one of $La_2O_3$, $Ce_2O_3$, $Gd_2O_3$, $Lu_2O_3$, $Ba_2OF_2$, $Sr_2OF_2$, $Ca_2OF_2$, $Ba_2OCl_2$, $Sr_2OCl_2$, $Ca_2OCl_2$, BaO, SrO, CaO, or ZnO; provided that when M comprises BaO, SrO, CaO, or ZnO, M does not comprise $La_2O_3$, $Ce_2O_3$, $Gd_2O_3$, $Lu_2O_3$, $Ba_2OF_2$, $Sr_2OF_2$, $Ca_2OF_2$, $Ba_2OCl_2$, $Sr_2OCl_2$, or $Ca_2OCl_2$; X is at least one of MgO or ZnO; m=0 to 2; n=4 to 11;

x=0.005 to 1; y=0.005 to 1; p=0 to 1; k=0 to 0.2; r=0 to 0.2; and v=0 to 0.2. These suitable host matrices have hexagonal symmetry and contain Al—O spinel blocks, in which $Al^{3+}$ occupies either tetrahedral or octahedral sites of the spinel blocks. Thus, when doped with $Mn^{2+}$, $M^{3+}$ of the host matrix is partially or fully replaced with that of $Mn^{2+}$.

FIG. 1 shows the excitation and emission spectrum of $LaAl_{11}O_{18}$:$Mn_{0.15}$ under 450 nm blue LED excitation, in which all excitation peaks are labeled in cubic field representations. The excitation is strong at around 450 nm with spectral width at around 20 nm and the peak of the emission is at around 520 nm, which is characteristically in the green region of the electromagnetic spectrum. This shows that certain $Mn^{2+}$ doped aluminate phosphors are suitable for use in blue AC LED lighting applications.

Figure 2:
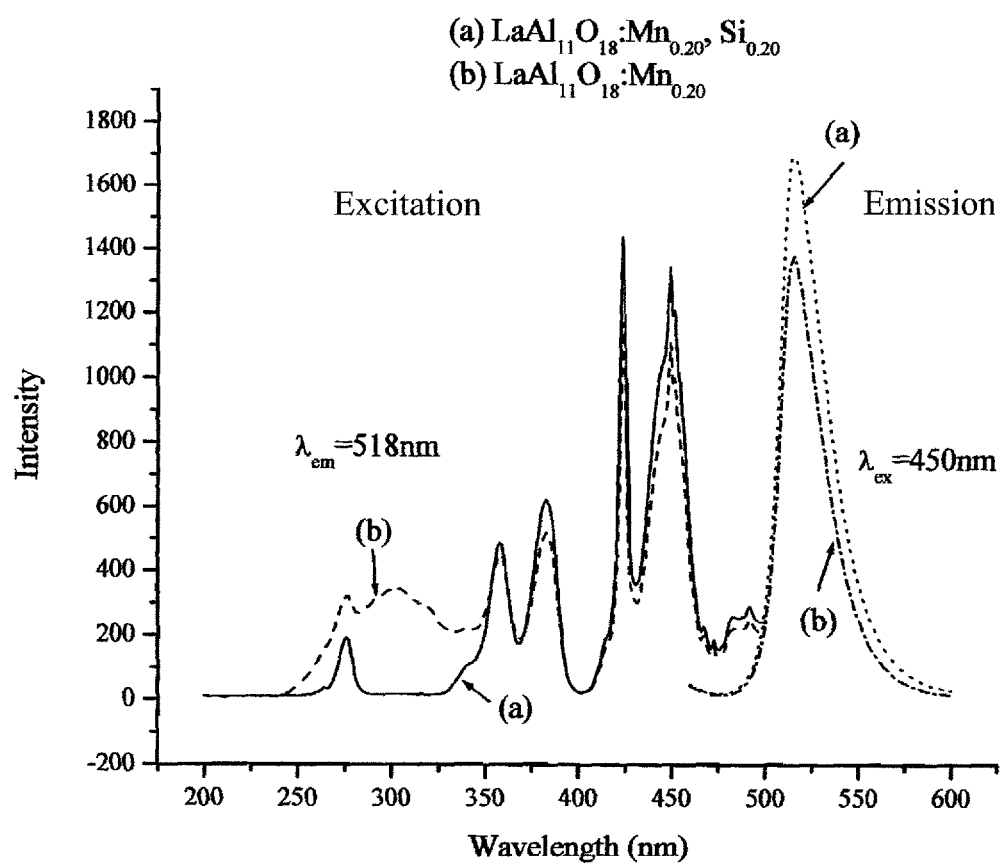
FIG. 2 shows the emission and excitation spectra (a) of an exemplary smoothing phosphor represented by the formula $LaAl_{11}O_{18}:Mn_{0.20}$, $Si_{0.20}$, compared to the excitation and emission spectra (b) of $LaAl_{11}O_{18}:Mn_{0.20}$ to illustrate the impact of charge compensation with $Si^{4+}$.

It was further determined that the $Mn^{2+}$ doped aluminate phosphors, possess a charge defect as a result of the oxygen vacancies created by the partial or full substitution of $Mn^{2+}$ for that of $Al^{3+}$. A charge defect refers to defects in the crystalline matrix of a phosphor as a result of the replacement, partial or full, of one atom for another in the matrix that is not an exact match in charge (valence state), thereby resulting in altered photoluminescent characteristics, such as e.g., decrease of emission intensity. Thus, in order to minimize the charge defects produced by such substitution, the smoothing phosphors of the present teachings are also further co-doped with $Si^{4+}$. As an example, FIG. 2 shows the excitation and emission spectra (a) of an exemplary smoothing phosphor represented by the formula $LaAl_{11}O_{18}$:$Mn_{0.20}$, $Si_{0.20}$ compared to the excitation and emission spectra (b) of $LaAl_{11}O_{18}$:$Mn_{0.20}$ under 450 nm blue LED excitation, to investigate the effect the incorporation of $Si^{4+}$ has on emission intensity. The emission intensity of $LaAl_{11}O_{18}$:$Mn_{0.20}$, $Si_{0.20}$ is more than approximately 20% greater than that of $LaAl_{11}O_{18}$:$Mn_{0.20}$. This further illustrates the impact the presence of charge defect(s) within the crystalline matrix of a phosphor has on emission intensity and the effectiveness of charge compensation.

Figure 3:
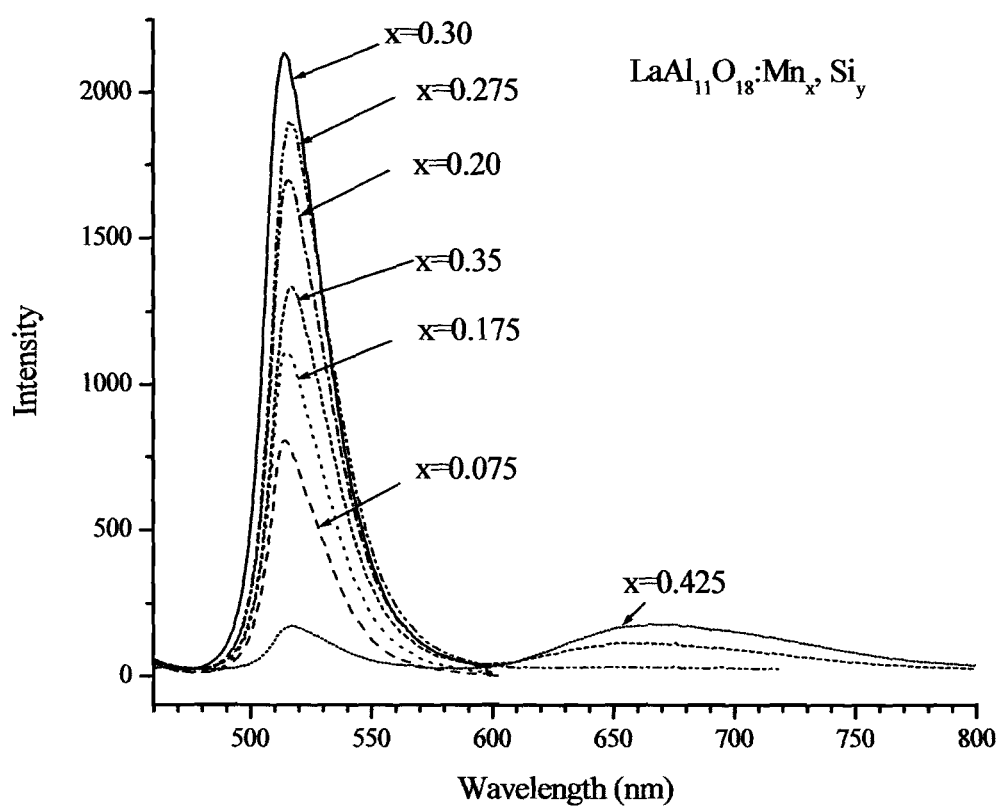
FIG. 3 shows a series of emission spectra of exemplary smoothing phosphors represented by the formula $LaAl_{11}O_{18}:Mn_x, Si_y$, where the $Mn^{2+}$ content, x, and the $Si^{4+}$ content, y, was varied as follows, x=y=0.075, 0.175, 0.20, 0.275, 0.30, 0.35, and 0.425, to investigate the role that $Mn^{2+}$ content has on emission intensity.

The concentration of $Mn^{2+}$ within the smoothing phosphor should be as a high as possible to maximize the excitation intensity of $Mn^{2+}$. However with too high $Mn^{2+}$ content, concentration quenching can occur, thereby reducing the emission intensity of the smoothing phosphor. Thus, there is a balance that exists between the excitation intensity, the emission intensity, and $Mn^{2+}$ content of the smoothing phosphor. The role that $Mn^{2+}$ content has on the emission intensity of the smoothing phosphors of the present teachings was investigated. FIG. 3 depicts a series of emission spectra of exemplary smoothing phosphors represented by the formula $LaAl_{11}O_{18}$:$Mn_x$, $Si_y$, under 450 nm blue LED excitation, where the $Mn^{2+}$ content, x, and the $Si^{4+}$ content, y, was varied as follows, x=y=0.075, 0.175, 0.20, 0.275, 0.30, 0.35, and 0.425. As illustrated in FIG. 3, the maximum emission intensity reached before concentration quenching occurs is shown to be at a $Mn^{2+}$ content of about 0.30 mols. Furthermore, as shown in FIG. 3, as concentration quenching begins to occur, a decrease in emission intensity results.

Figure 4:
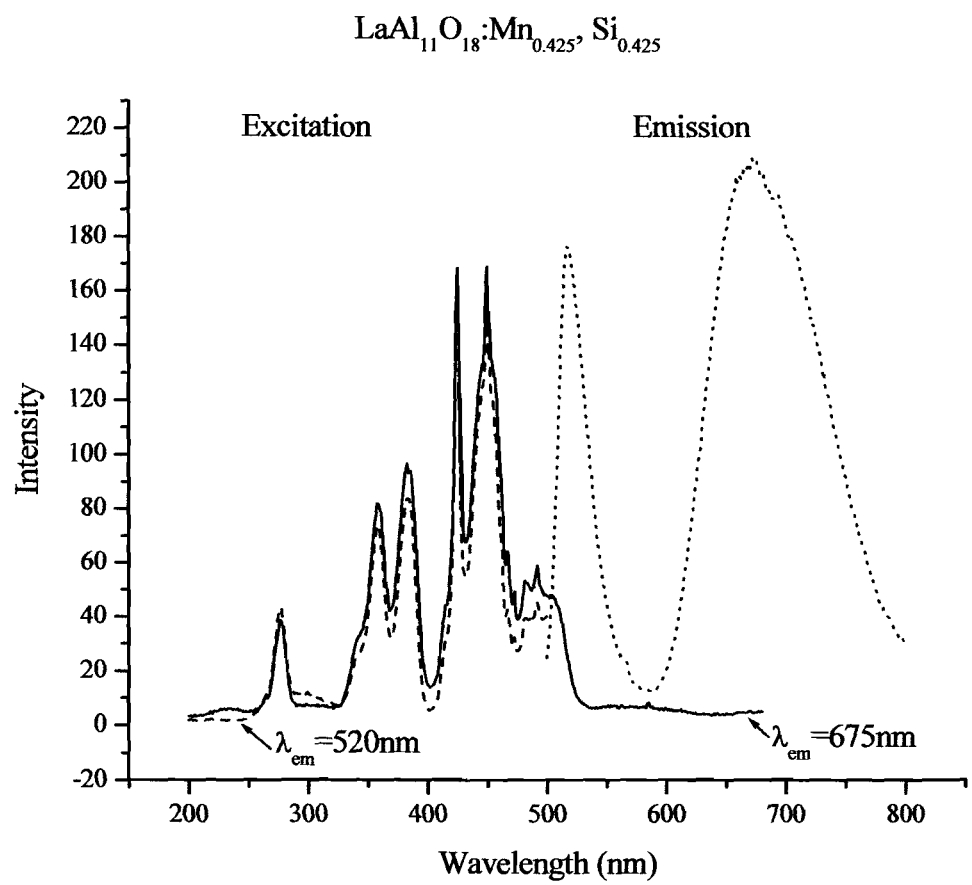
FIG. 4 shows the excitation and emission spectra of an exemplary smoothing phosphor having the formula $LaAl_{11}O_{18}:Mn_{0.425}$, $Si_{0.425}$ to illustrate the red emission bands produced from Mn—Mn pairs.

FIG. 4 is the excitation and emission spectra of an exemplary smoothing phosphor having the formula $LaAl_{11}O_{18}$:$Mn_{0.425}$, $SiO_{0.425}$. As seen in FIG. 4, at a $Mn^{2+}$ content of about 0.425 mol, the emission peak at about 675 nm becomes strong and broad, which can be beneficial in white lighting applications. The emission intensity increases nonlinearly and rapidly with $Mn^{2+}$ content. Therefore, the emission of $Mn^{2+}$ in the red region of the electromagnetic spectrum is not due to other high field sites, but rather is presumably due to Mn—Mn pairs. The number of pairs should increase as squared concentration. It should be noted that in some instances where the contribution of $Mn^{2+}$ emission in the red region of the electromagnetic spectrum is considered, concentration quenching resulting in the reduction of emission intensity at about 520 nm may not substantially impact the overall emission intensity of the smoothing phosphor. Furthermore, it should be noticed that the excitation spectrum of the red emission band is similar to the excitation spectrum of single $Mn^{2+}$ ions, and therefore indicates that the emission of the Mn—Mn pairs results from the energy transfer through single-$Mn^{2+}$ ions, along with having an emission lifetime as long as single-$Mn^{2+}$ ions.

Figure 5:
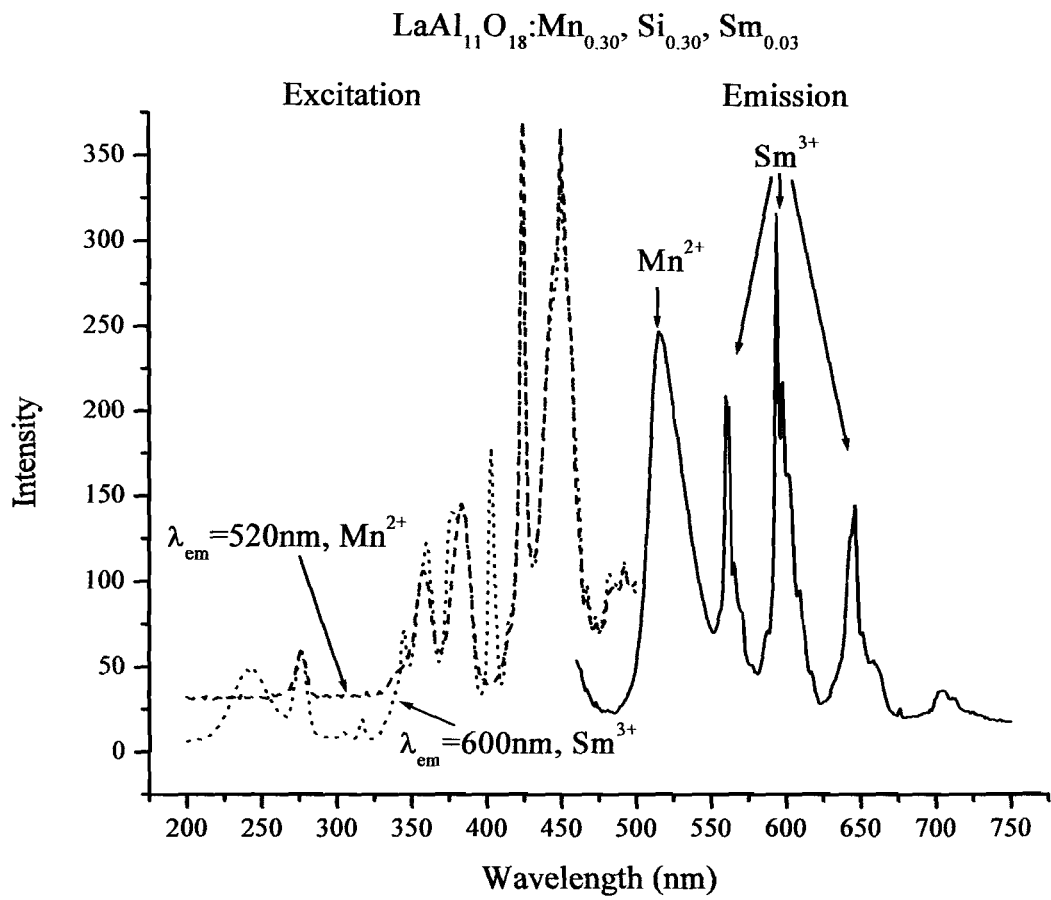
FIG. 5 shows the excitation and emission spectra of an exemplary smoothing phosphor having the formula $LaAl_{11}O_{18}:Mn_{0.30}$, $Si_{0.30}$, $Sm_{0.03}$ to illustrate the effect of further co-doping with $Sm^{3+}$.

Alternatively or in addition to the Mn—Mn pairs emission, the smoothing phosphors of the present teachings may also emit light in the red region of the electromagnetic spectrum with the further co-doping of rare earths such as $Sm^{3+}$, $Pr^{3+}$, $Tb^{3+}$, $Dy^{3+}$, $Er^{3+}$, or $Ho^{3+}$. For example, FIG. 5 illustrates the excitation and emission spectra of an exemplary smoothing phosphor having the formula $LaAl_{11}O_{18}$:$Mn_{0.30}$, $Si_{0.30}$, $Sm_{0.03}$. As seen in FIG. 5, the presence of $Sm^{3+}$ adds three narrow emission peaks at around 560 nm, 598 nm, and 645 nm. It should be noted that the excitation spectrum monitoring at $Sm^{3+}$ emission peaks is similar to that of the $Mn^{2+}$ excitation spectrum, thereby implying that the $Sm^{3+}$ emission results from energy transfer from $Mn^{2+}$, along with the $Sm^{3+}$ emission lifetime being substantially similar to the emission lifetime of $Mn^{2+}$. In other words, $Sm^{3+}$ not only contributes to the smoothing phosphors emission of light in the red region of the electromagnetic spectrum, which is beneficial in white lighting applications, but also to the reduction of flicker of an AC driven LED (or array of LEDs). It should be noted that in some instances, the smoothing phosphors of the present teachings may also be further co-doped with $Li^+$ to function as a charge compensator for the charge defect that may result with the presence of $Sm^{3+}$.

Figure 6:
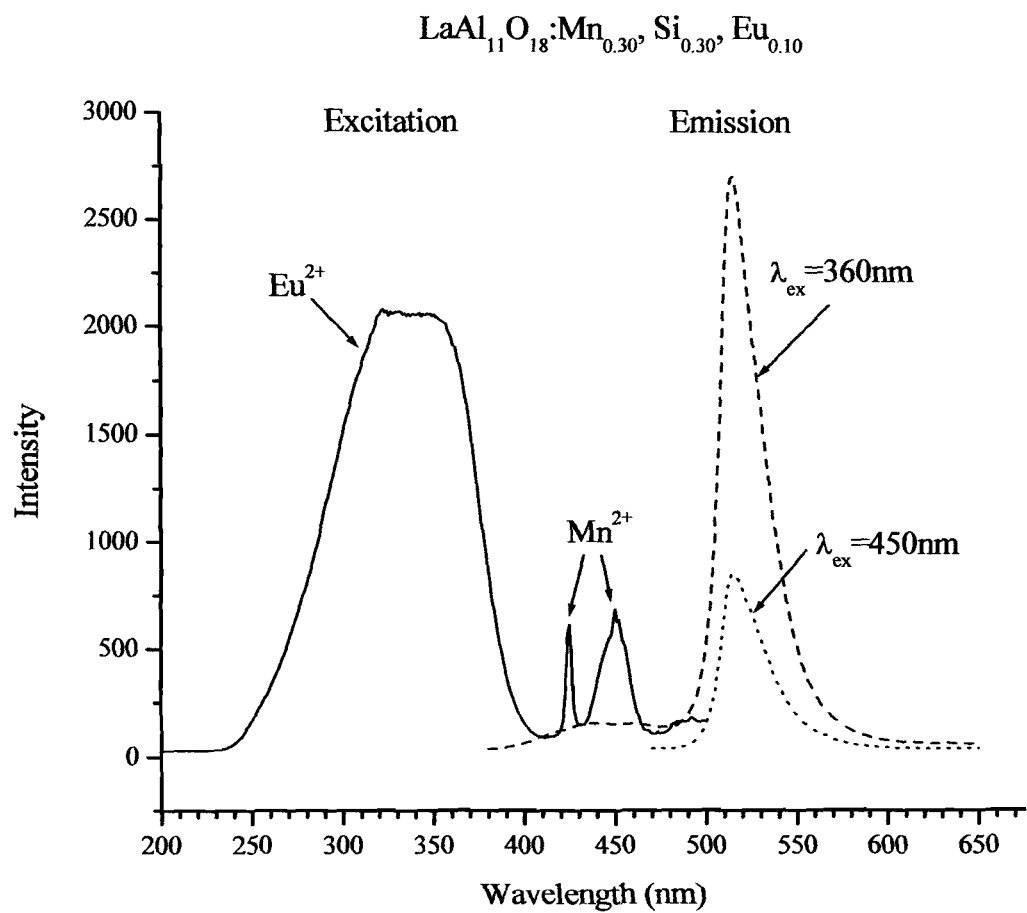
FIG. 6 shows the excitation and emission spectra of an exemplary smoothing phosphor having the formula $LaAl_{11}O_{18}:Mn_{0.30}$, $Si_{0.30}$, $EU_{0.10}$ to investigate the impact on excitation intensity of $Mn^{2+}$ emission with the further co-doping of $Eu^{2+}$.

In another aspect of the present teachings, the smoothing phosphors may be further co-doped with $Eu^{2+}$ so as to enhance the excitation intensity, and thus the emission intensity, of $Mn^{2+}$. The emission spectrum of $Eu^{2+}$ overlaps with the excitation spectrum of $Mn^{2+}$, therefore it is possible through energy transfer from $Eu^{2+}$ to $Mn^{2+}$ to increase excitation in the spectral range of about 360 to 410 nm of the smoothing phosphors of the present teachings. As an example, FIG. 6 illustrates the excitation and emission spectra of an exemplary smoothing phosphor having the formula $LaAl_{11}O_{18}$:$Mn_{0.30}$, $Si_{0.30}$, $Eu^{0.10}$ under 450 nm blue LED excitation. As shown in FIG. 6, the energy transfer that occurs between $Eu^{2+}$ and $Mn^{2+}$ is efficient, thereby increasing the excitation intensity of the $Mn^{2+}$ emission in the spectral range of about 365-380 nm. This increase of $Mn^{2+}$ excitation intensity indicates that such material is an exemplary smoothing phosphor that is also suitable for use in UV AC LED lighting applications.

Figure 7:
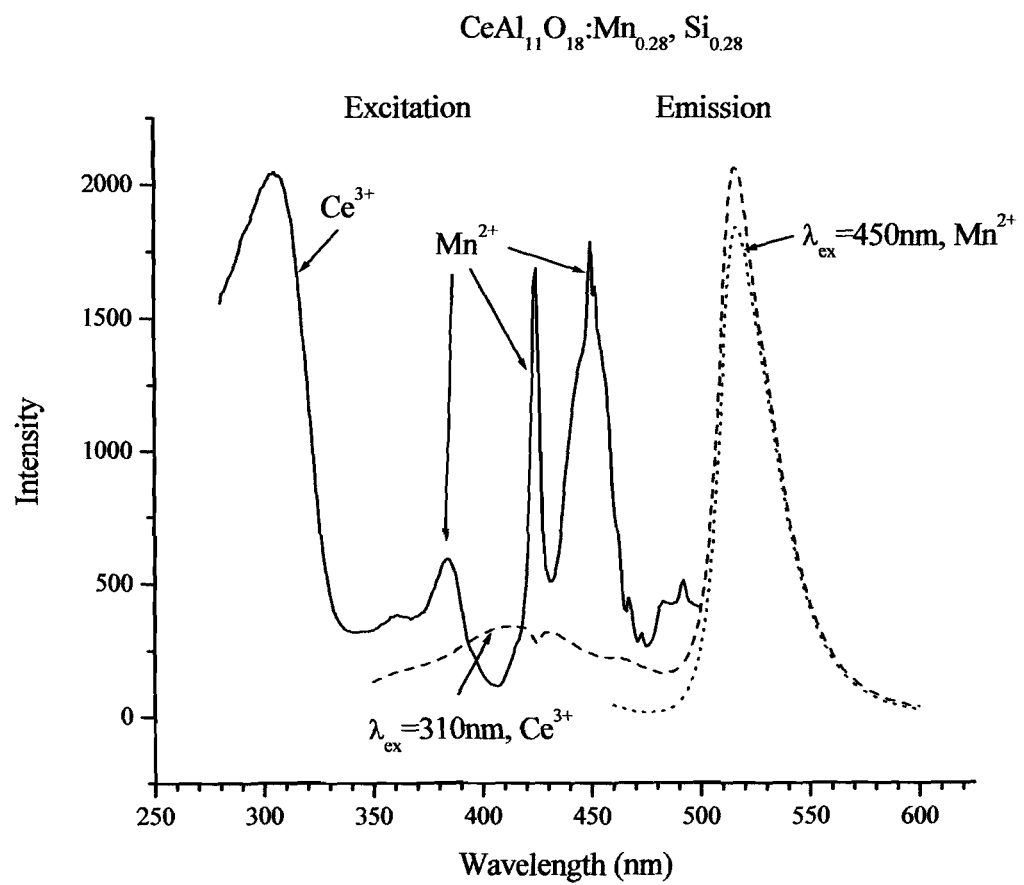
FIG. 7 shows the emission and excitation spectra of an exemplary smoothing phosphor having the formula $CeAl_{11}O_{18}:Mn_{0.28}, Si_{0.28}$.
Figure 8A:
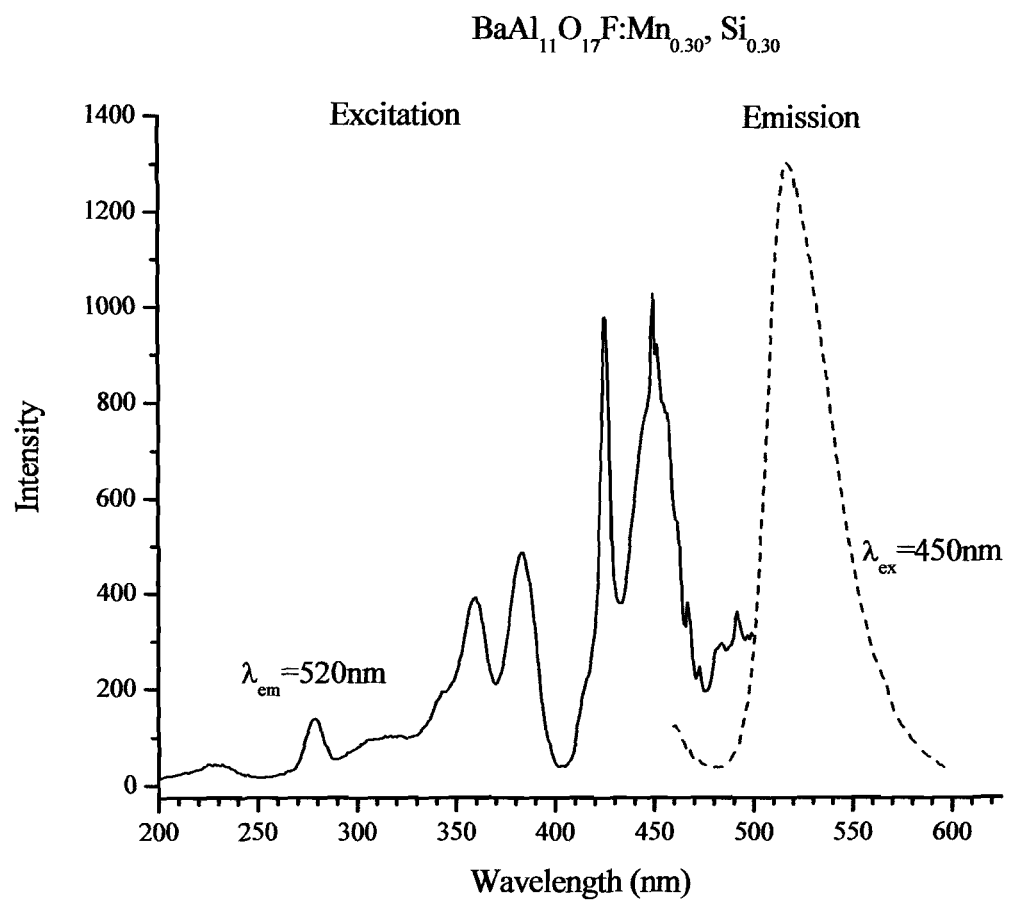
FIG. 8A shows the emission and excitation spectra of an exemplary smoothing phosphor having the formula $BaAl_{11}O_{17}F:Mn_{0.30}, Si_{0.30}$.
Figure 8B:
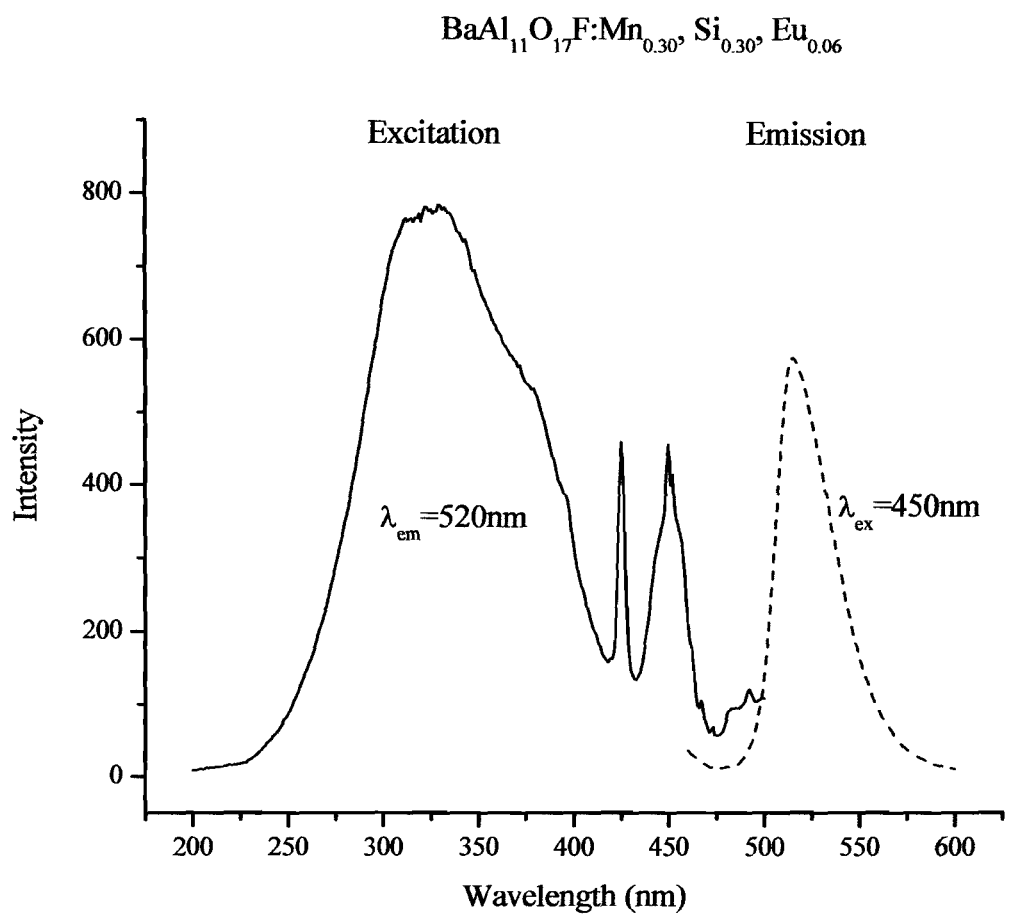
FIG. 8B shows the emission and excitation spectra of an exemplary smoothing phosphor having the formula $BaAl_{11}O_{17}F:Mn_{0.30}, Si_{0.30}, EU_{0.06}$.
Figure 9:
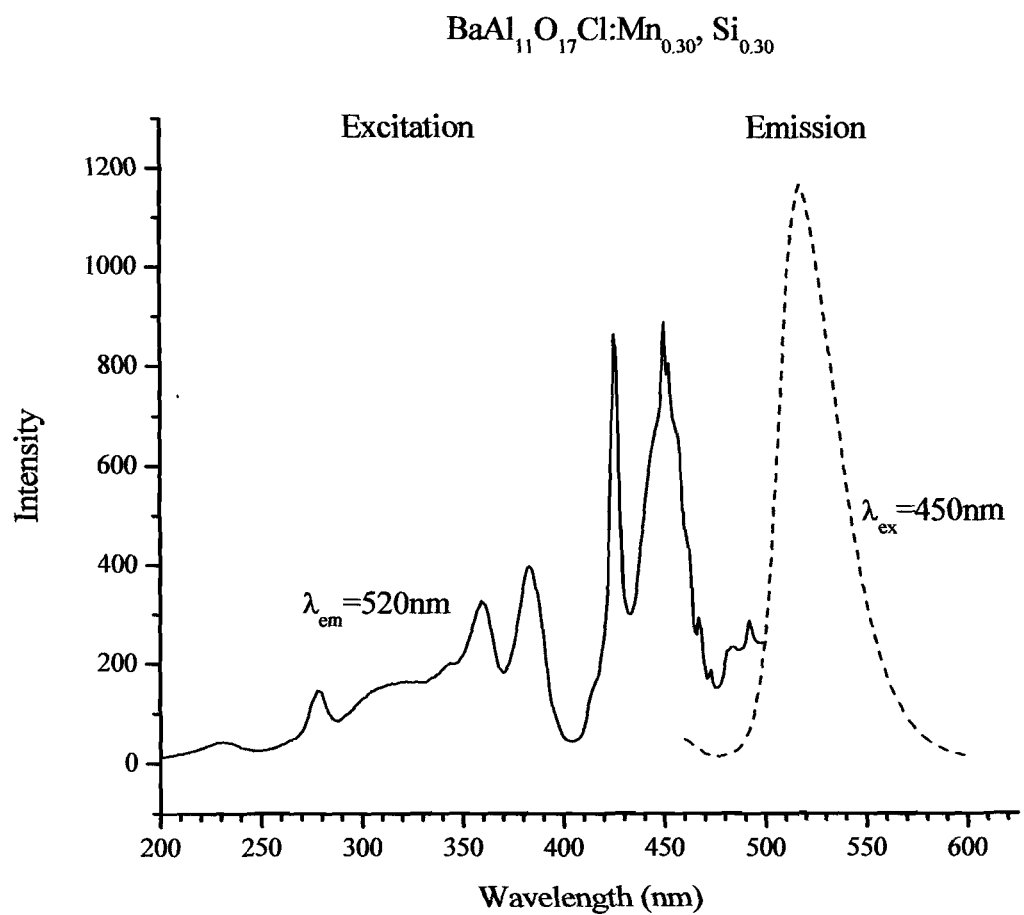
FIG. 9 shows the emission and excitation spectra of an exemplary smoothing phosphor having the formula $BaAl_{11}O_{17}Cl:Mn_{0.30}, Si_{0.30}$.
Figure 10:
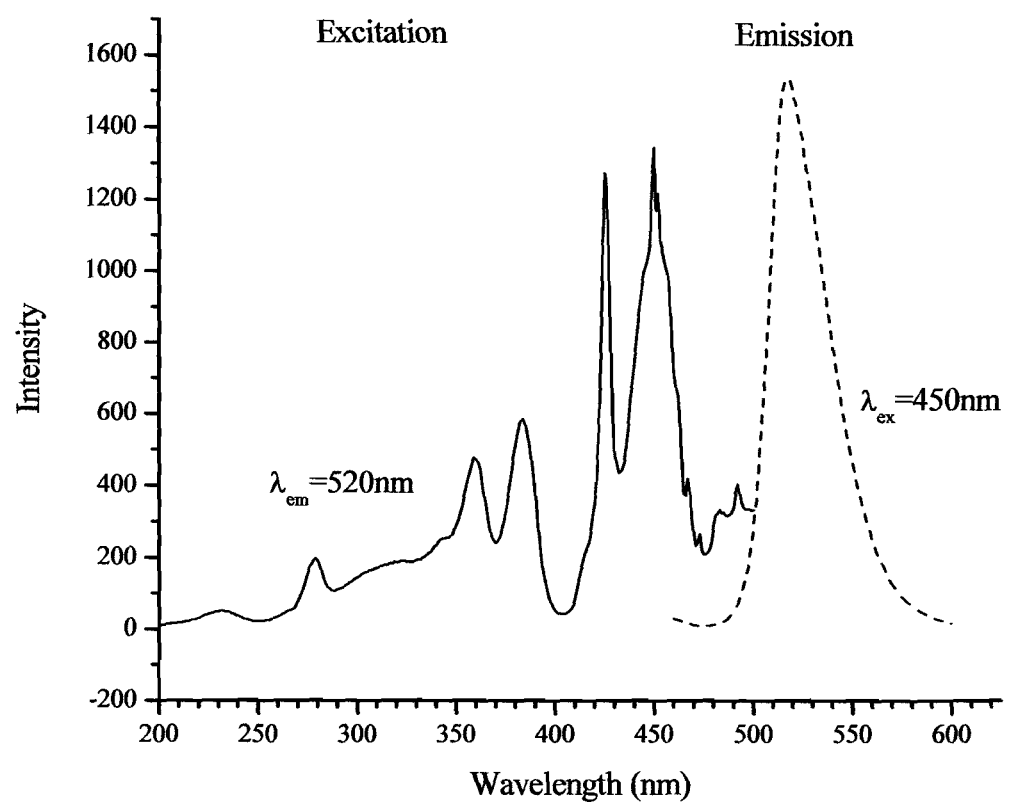
FIG. 10 shows the emission and excitation spectra of an exemplary smoothing phosphor having the formula $Ba_{0.5}Ca_{0.5}Al_{11}O_{17}F:Mn_{0.20}, Si_{0.20}$.

Other exemplary smoothing phosphors in accordance with the present teachings are illustrated in FIGS. 7-10, in which $La_2O_3$ is partially or fully replaced with at least one of $Ce_2O_3$, $Gd_2O_3$, $Lu_2O_3$, $Ba_2OF_2$, $Sr_2OF_2$, $Ca_2OF_2$, $Ba_2OCl_2$, $Sr_2OCl_2$, or $Ca_2OCl_2$. FIG. 7 shows the emission and excitation spectra of an exemplary smoothing phosphor having the formula $CeAl_{11}O_{18}$:$Mn_{0.28}$, $Si_{0.28}$ under 450 nm blue LED excitation. The strong excitation peak at about 310 nm originates from $Ce^{3+}$ 5d transition. Since this excitation peak appears in the excitation spectrum of $Mn^{2+}$ emission, energy transfer from $Ce^{3+}$ to $Mn^{2+}$ is indicated. Furthermore, when such smoothing phosphor was pumped at the excitation peak of $Ce^{3+}$ at about 310 nm, the residual weak emission from $Ce^{3+}$ that results also indicates that energy transfer from $Ce^{3+}$ to $Mn^{2+}$ occurred. FIG. 8A shows the emission and excitation spectra of an exemplary smoothing phosphor having the formula $BaAl_{11}O_{17}F:Mn_{0.30}$, $Si_{0.30}$ under 450 nm blue LED excitation. It can be seen that a strong excitation peak appears at about 450 nm which is similar to the exemplary smoothing phosphor lanthanum aluminate co-doped with $Mn^{2+}$ and $Si^{4+}$. FIG. 8B shows the emission and excitation spectra of an exemplary smoothing phosphor having the formula $BaAl_{11}O_{17}F:Mn_{0.30}$, $Si_{0.30}$, $Eu_{0.06}$ under 450 nm blue LED excitation. It can be seen that a strong excitation peak appears at about 330 nm, and strong energy transfer from $Eu^{2+}$ to $Mn^{2+}$ occurs. FIG. 9 shows the emission and excitation spectra of an exemplary smoothing phosphor having the formula $BaAl_{11}O_{17}Cl:Mn_{0.30}$, $Si_{0.30}$ under 450 nm blue LED excitation. FIG. 10 shows the emission and excitation spectra of an exemplary smoothing phosphor having the formula $Ba_{0.5}Ca_{0.5}Al_{11}O_{17}F:Mn_{0.20}$, $Si_{0.20}$ under 450 nm blue LED excitation.

Figure 11:
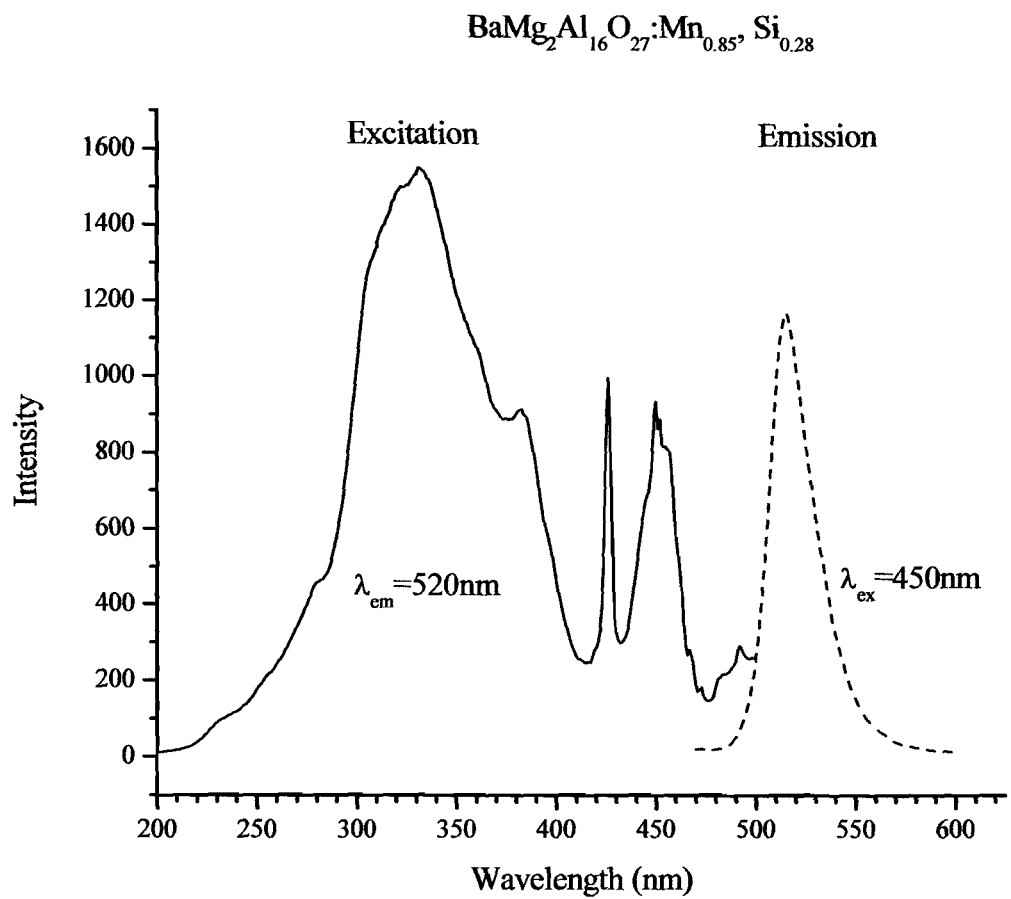
FIG. 11 shows the emission and excitation spectra of an exemplary smoothing phosphor having the formula $BaMg_2Al_{16}O_{27}:Mn_{0.85}, Si_{0.28}$.
Figure 12:
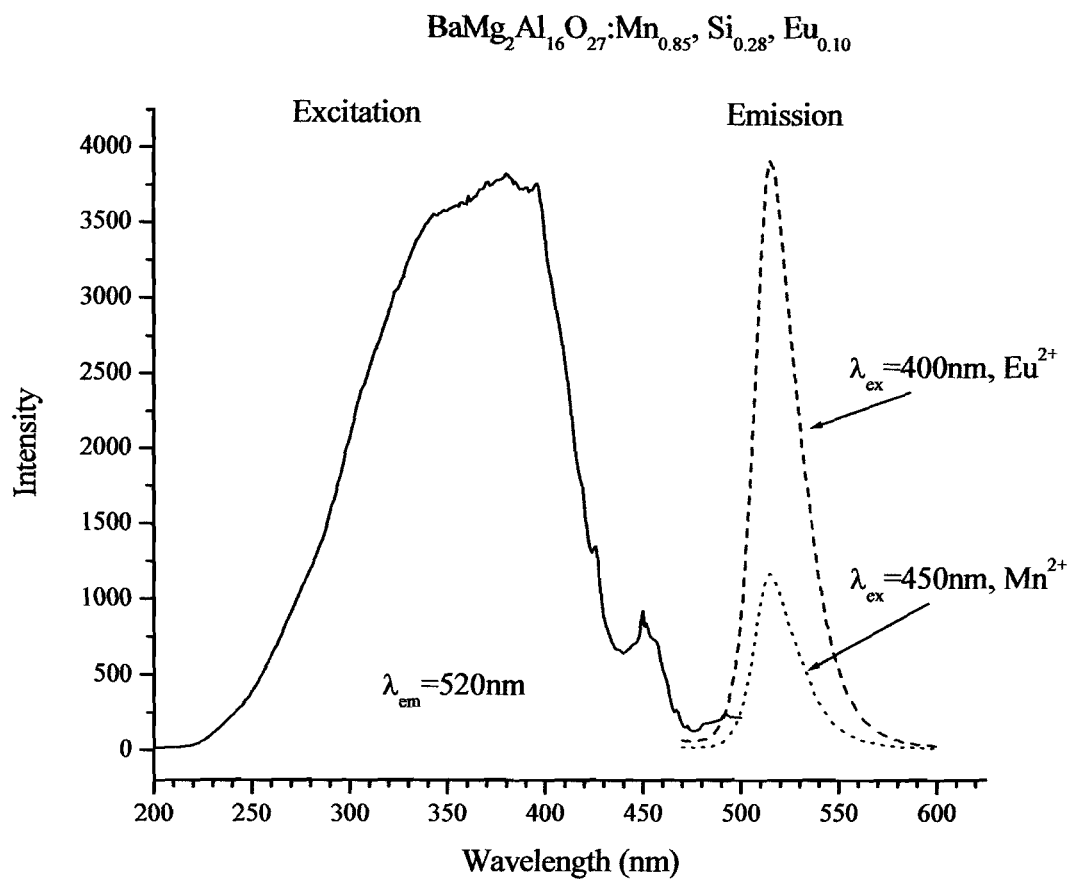
FIG. 12 shows the emission and excitation spectra of an exemplary smoothing phosphor having the formula $BaMg_2Al_{16}O_{27}:Mn_{0.85}, Si_{0.28}, EU_{0.10}$.
Figure 13:
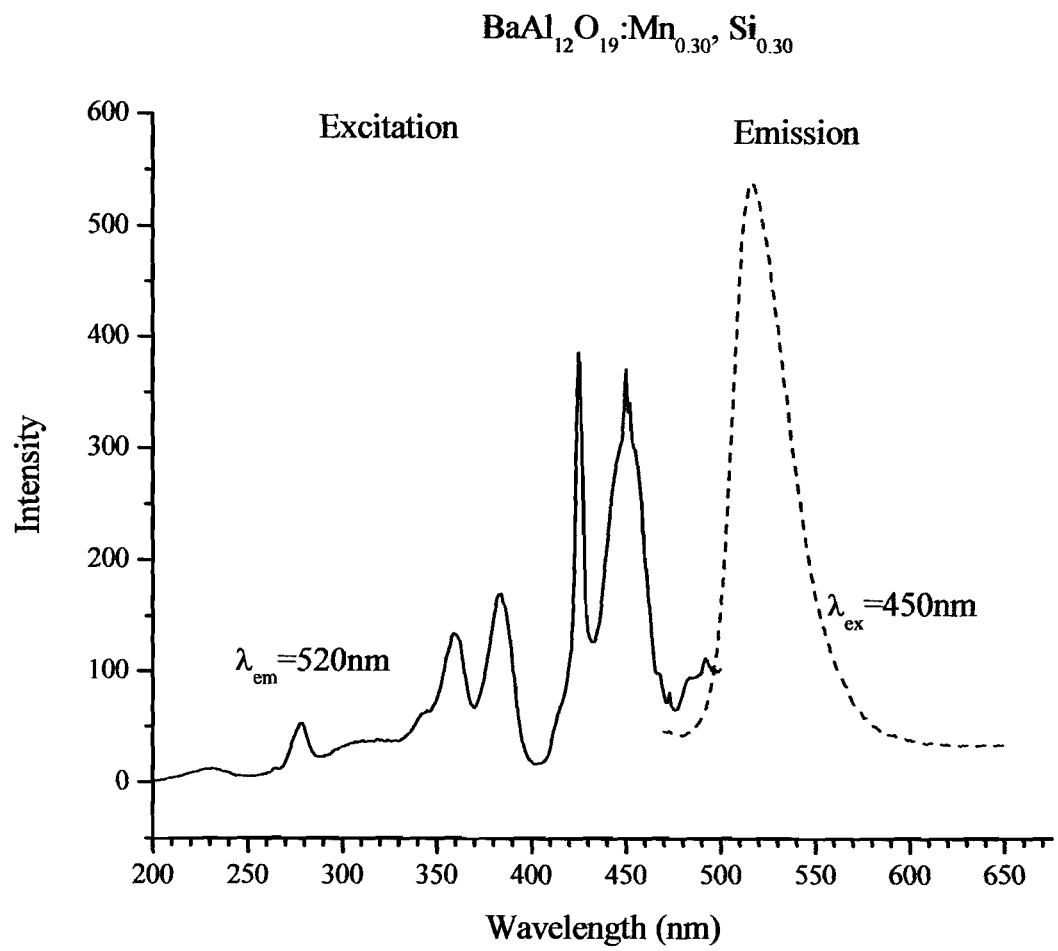
FIG. 13 shows the emission and excitation spectra of an exemplary smoothing phosphor having the formula $BaAl_{12}O_{19}:Mu_{0.30}, Si_{0.30}$.
Figure 14:
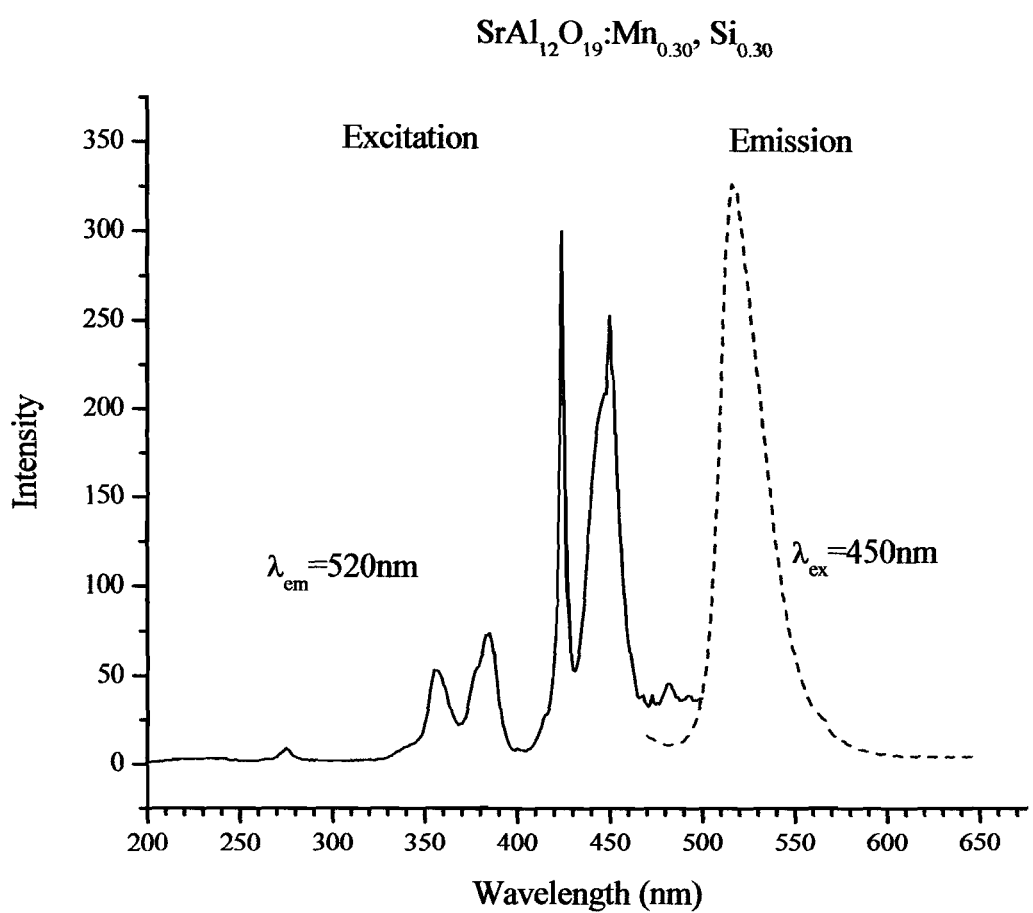
FIG. 14 shows the emission and excitation spectra of an exemplary smoothing phosphor having the formula $SrAl_{12}O_{19}:Mu_{0.30}, Si_{0.30}$.

Other exemplary smoothing phosphors in accordance with the present teachings are illustrated in FIGS. 11-14, in which $La_2O_3$ is fully replaced with at least one of BaO, SrO, CaO, or ZnO. In other words, in instances where at least one of BaO, SrO, CaO or ZnO is incorporated into the host matrix of the smoothing phosphor of the present teachings, $La_2O_3$, $Ce_2O_3$, $Gd_2O_3$, $Lu_2O_3$, $Ba_2OF_2$, $Sr_2OF_2$, $Ca_2OF_2$, $Ba_2OCl_2$, $Sr_2OCl_2$, or $Ca_2OCl_2$ are not present within the host matrix. FIG. 11 shows the emission and excitation spectra of an exemplary smoothing phosphor having the formula $BaMg_2Al_{16}O_{27}:Mn_{0.85}$, $Si_{0.28}$ under 450 nm blue LED excitation. The emission peak is located at about 520 nm, which is similar to the exemplary smoothing phosphor lanthanum aluminate co-doped with $Mn^{2+}$ and $Si^{4+}$, and the excitation peak at about 450 nm remains strong, but a broad and strong excitation band of $Mn^{2+}$ is at about 330 nm. FIG. 12 shows the emission and excitation spectra of an exemplary smoothing phosphor having the formula $BaMg_2Al_{16}O_{27}:Mn_{0.85}$, $Si_{0.28}$, $Eu_{0.10}$ under 450 nm blue LED excitation. It can be seen that a strong and broad excitation band of $Eu^{2+}$ overlaps with the $Mn^{2+}$ excitation band of about 330 nm and extends to about 410 nm. The emission peak at about 520 nm is measured by pumping the overlapped band at about 400 nm. Thus, when compared to the excitation peak of $Mn^{2+}$ at about 450 nm, the intensity of the emission peak indicates that the energy transfer from $Eu^{2+}$ to $Mn^{2+}$ contributes to most of the emission of the $Mn^{2+}$ ions. This increase of $Mn^{2+}$ excitation intensity indicates that such exemplary smoothing phosphor is also suitable for use in UV AC LED lighting applications. FIG. 13 shows the emission and excitation spectra of an exemplary smoothing phosphor having the formula $BaAl_{12}O_{19}:Mn_{0.30}$, $Si_{0.30}$ under 450 nm blue LED excitation. The strongest excitation peak is located at about 450 nm, which is similar to the smoothing phosphor lanthanum aluminate co-doped with $Mn^{2+}$ and $Si^{4+}$. FIG. 14 shows the emission and excitation spectra of an exemplary smoothing phosphor having the formula $SrAl_{12}O_{19}:Mn_{0.30}$, $Si_{0.30}$ under 450 nm blue LED excitation. Similar to that of FIG. 13, the strongest excitation peak of this exemplary smoothing phosphor is located at about 450 nm.

A number of methods may be used to synthesize the smoothing phosphors of the present teachings such as, liquid mixing methods, solid chemical reaction methods, etc. Liquid mixing methods include methods such as co-precipitation and sol-gel techniques. In solid chemical reaction methods, a flux, such as $H_3BO_3$ or $B_2O_3$, is used to stimulate the solid chemical reaction. A solid chemical reaction method may include admixing various starting materials in a predetermined ratio and pre-sintering them in a furnace, followed by grinding and sintering in the furnace at a higher temperate. For example in instances of lab scale, one method may include weighing the starting materials of the smoothing phosphor into a weighing dish, followed by admixing the materials and grinding into a mortar with a pestle until uniform. The ground material is then placed in an alumina combustion boat and placed in an oven at around 900° C. in air or in a forming gas mixture of 97% $N_2$, and 3% $H_2$ at a rate of 50 $cm^3$min for four hours. The material is then cooled and ground again in a mortar with a pestle, followed by again placing the material into an alumina combustion boat and sintered at around 1350° C. to 1450° C. for four hours in the forming gas mixture of 97% $N_2$ and 3% $H_2$ at a rate of 50 $cm^3$min. The material is then cooled and ground to a powder of the desired particle size to yield a smoothing phosphor in accordance with the present teachings.

For the purposes of describing and defining the present teachings, it is noted that the term "substantially" is utilized herein to represent the inherent degree of uncertainty that may be attributed to any quantitative comparison, value, measurement or other representation. The term "substantially" is also utilized herein to present the degree by which a quantitative representation may vary from a stated reference without resulting in a change in the basic function of the subject matter at issue.

Although the teachings have been described with respect to various embodiments, it should be realized that these teachings are also capable of a wide variety of further and other embodiments within the spirit and scope of the appended disclosure.

What is claimed is:

1. A smoothing phosphor for AC LED lighting, said smoothing phosphor comprising a matrix represented by the formula:

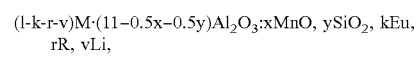

$(1-k-r-v)M\cdot(11-0.5x-0.5y)Al_2O_3:xMnO, ySiO_2, kEu, rR, vLi,$ wherein:
M is at least one of $La_2O_3$, $Ce_2O_3$, $Gd_2O_3$, or $Lu_2O_3$
R is at least one of Sm, Pr, Tb, Dy, Er, or Ho;
x=y=0.005 to 1;
k=0 to 0.2;
r=0 to 0.2; and
v=0 to 0.2.

2. A smoothing phosphor for AC LED lighting, said smoothing phosphor comprising a matrix represented by the formula:

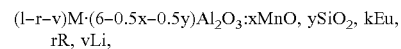

$(1-r-v)M\cdot(6-0.5x-0.5y)Al_2O_3:xMnO, ySiO_2, kEu, rR, vLi,$ wherein:
M is at least one of BaO, SrO, CaO, or ZnO;
R is at least one of Sm, Pr, Tb, Dy, Er, or Ho;
x=y=0.005 to 1;
k=0 to 0.2;
r=0 to 0.2; and
v=0 to 0.2.

3. The smoothing phosphor of claim 2, wherein M is BaO.

* * * * *